Dec. 19, 1961 R. E. MEYER 3,013,386
REVERSE THRUST DEVICE
Filed June 1, 1954
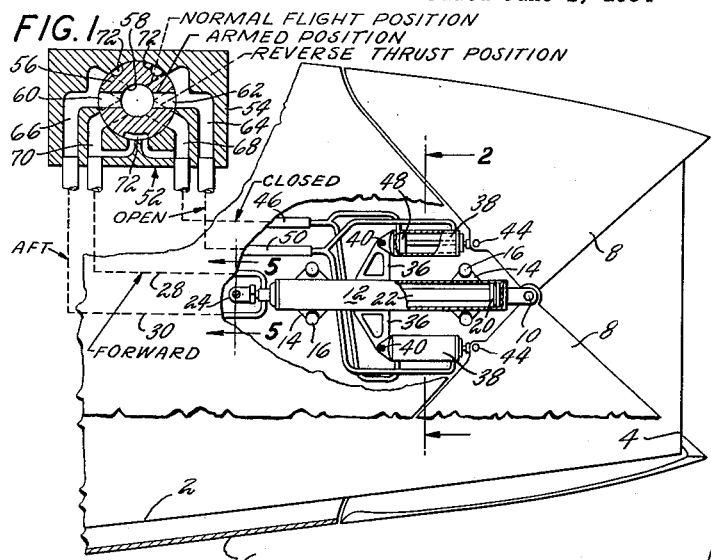
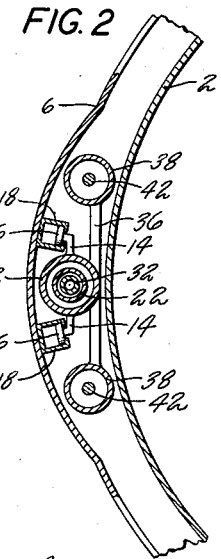
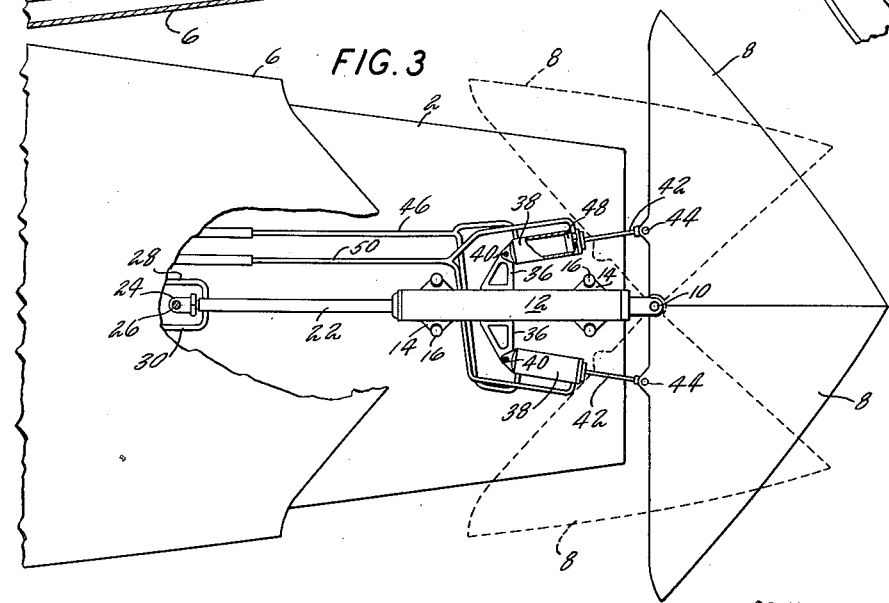
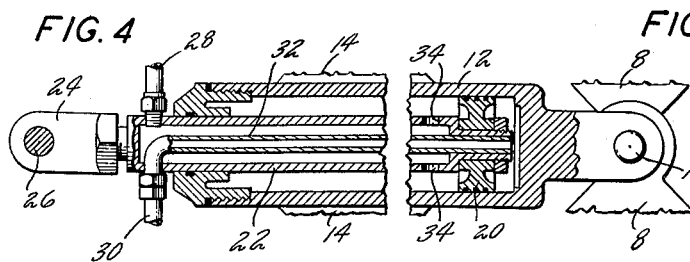
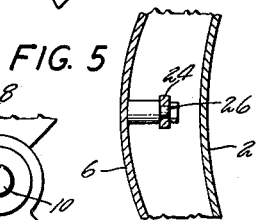
INVENTOR
ROBERT E. MEYER
BY Charles A Warren
ATTORNEY 3,013,386
REVERSE THRUST DEVICE
Robert E. Meyer, Glastonbury, Conn., assignor to United Aircraft Corporation, East Hartford, Conn., a corporation of Delaware
Filed June 1, 1954, Ser. No. 433,715
1 Claim. (Cl. 60—35.54)

The present invention relates to a device for reversing the thrust in a jet engine.

In propeller driven aircraft the landing run is reduced by reversing the pitch of the propellers to effect a braking action. With jet driven aircraft, however, the braking action of the propeller is not available and the braking action of the wheel brakes is not adequate for the high speed jet propelled aircraft. One feature of the present invention is to provide for reversal of the thrust of the jet engine in order to produce a substantial braking action. Another feature of the invention is a device for reversing thrust which in its inoperative position does not interfere with the normal operation of the jet engine or the power plant.

Other objects and advantages will be apparent from the specification and claims, and from the accompanying drawings which illustrate an embodiment of the invention.

FIG. 1 is a side elevation with parts broken away showing the reversing thrust device in inoperative position.

FIG. 2 is a sectional view along line 2—2 of FIG. 1.

FIG. 3 is a view similar to FIG. 1 showing the reverse thrust device extended in operative position.

FIG. 4 is a sectional view through the main actuating cylinder.

FIG. 5 is a fragmentary sectional view on the line 5—5 of FIG. 1.

Referring first to FIG. 1, the exhaust duct 2 of a jet engine terminates in a thrust nozzle 4 through which the exhaust gases are discharged in the form of a propulsive jet. The exhaust duct 2 is enclosed within a cowling 6 which is preferably spaced from the exhaust duct to avoid a direct transfer of heat from the duct to the cowling.

The reverse thrust device consists of a pair of eyelids or flaps 8 which in inoperative position surround the rearward end of the duct and are preferably located in line with the cowling 6 to form an extension thereof. These flaps are pivoted on pins 10 on opposite sides of the exhaust duct and are moved bodily in the rearward direction by moving the pivot pins 10 thereby shifting the flaps far enough rearwardly to permit the flaps to be moved into the closed or operative position shown in full line in FIG. 3. In the inoperative position, these flaps, as clearly shown in FIG. 1, do not interfere with the discharge of gases from the nozzle 4 and do not therefore, interfere with the operation of the jet engine in any way.

For shifting the flaps rearwardly, each of the pivot pins 10 or hinge joints is carried by a cylinder 12 having projecting flanges 14 carrying rollers 16 which are received in guides 18 mounted on the inside of the fairing or cowling 6 thereby permitting longitudinal movement of the cylinder with respect to the fairing and the enclosed duct.

Referring to FIG. 4, the cylinder 12 has a piston 20 therein, with a piston rod 22 which extends from the cylinder at the end opposite of the pivot pin 10 and has a mounting lug 24 attached by a pivot pin 26 to the fairing 6 as shown in FIG. 5. Fluid for moving the cylinder longitudinally with respect to the enclosed piston is admitted selectively to opposite sides of the piston through conduits 28 and 30. The conduit 30 includes a pipe 32 extending through the hollow piston rod 22 and arranged to deliver actuating fluid to the right hand side of the piston 20. The conduit 28 includes the hollow piston rod outside of the pipe 32 and actuating fluid from the conduit 28 and through the piston rod enters the cylinder at the left hand side of the piston through ports 34 in the piston rod. The cylinder and piston constitute a fluid motor for shifting the pivotal support for the flaps.

The cylinder 12 has mounted on the outside thereof, in addition to the flanges 14, other flanges 36 which carry the actuating mechanism by which the flaps are swung on the pivot pins 10 from the inoperative armed position shown in dotted lines in FIG. 3, which is the extended inoperative position of the device, into the operative full-line position of FIG. 3. The actuating mechanism for each flap 8 includes a cylinder 38 pivoted to the flange 36 by a pin 40 and having a projecting piston rod 42 pivotally attached as by a pin 44 to the flap 8. Actuating fluid from conduit 46 is admitted to the left hand end of each cylinder, thereby, moving the piston 48 therein with its attached piston rod to the right to swing the flap into operative position. Actuating fluid through another conduit 50 which enters the right hand end of the cylinders 38 will move the flaps back into the inoperative extended position of FIG. 3. The tubes 46 and 50 are telescoping, as shown, in order to permit axial movement of the cylinders 38 as the device is shifted rearwardly as a unit. The piston 48 and cylinder 38 constitute a fluid motor for moving the flaps.

The admission of actuating fluid to the cylinder 12 and cylinders 38 is under the control of a valve device 52 which includes a valve body 54 and a movable valve element or valve 56. Actuating fluid under pressure is supplied to the central opening 58 in the valve 56 and is admitted through radial passages 60 and 62 to passages 64, 66, 68 and 70 in the valve housing. Vent passages 72 in valve 56 open conduits 28, 30, 46 and 50 to atmospheric pressure when actuating fluid under pressure is not being supplied. Passage 64 is connected to conduit 50 leading to the right hand end of cylinders 38 and passage 68 is connected to conduit 46 leading to the left hand end of cylinders 38. Passage 66 communicates with conduit 30 and passage 70 communicates with conduit 28. Passages 68 and 70 also have vent passages communicating therewith for venting conduits 46 and 28. Thus with the valve in the position shown in solid lines, actuating fluid under pressure is admitted through conduit 30 to the right hand side of piston 20 and has moved the device into the armed or inoperative extended position shown in dotted lines in FIG. 3. At the same time, fluid under pressure is admitted to conduit 50 and retains the flaps in the inoperative dotted line position. When the valve is moved into the dotted position identified as the reverse thrust position in FIG. 1, fluid under pressure is still admitted to the right hand end of the cylinder 12 but is now admitted to the left hand end of the cylinders 38 for moving the flaps into operative or reverse thrust position of FIG. 3.

When the flaps are to be retracted into normal flight position, the valve 56 is shifted so that the passages 60 and 62 are in the position identified in FIG. 1 as normal flight position. In this position the actuating fluid under pressure is admitted to the right hand end of the cylinders 38 to retract the flaps and is also admitted to the left hand end of the cylinder 12 to shift the device forwardly into the inoperative or flight position of FIG. 1.

It will be apparent that when the pair of flaps are in the reverse thrust position of FIG. 3, the gases discharging thrust to the thrust nozzle are reversed in direction and are caused to discharge forwardly from the space within the flaps. The change in direction of the gases leaves a balance of thrust acting rearwardly of the vehicle in which the jet is mounted so that the device acts as an effective brake.

It is to be understood that the invention is not limited to the specific embodiment herein illustrated and described, but may be used in other ways without departure from its spirit as defined by the following claim.

I claim:

The combination with a duct having a thrust nozzle at the end through which gas is discharged as a jet, of thrust reversal means surrounding said nozzle and normally located in a position forwardly of the end of the nozzle, means mounted on said duct for moving said thrust reversal means rearwardly as a unit into a position rearwardly of the end of the nozzle and other means connected to said first means for moving said thrust reversal means into a position to reverse the flow of gas after it leaves the nozzle.

References Cited in the file of this patent

UNITED STATES PATENTS

| | | |
|---|---|---|
| 2,320,601 | Howell | June 1, 1943 |
| 2,400,237 | Kylin et al. | May 14, 1946 |
| 2,620,622 | Lundberg | Dec. 9, 1952 |
| 2,637,164 | Robson et al. | May 5, 1953 |
| 2,715,312 | Brame | Aug. 16, 1955 |
| 2,735,264 | Jewett | Feb. 21, 1956 |
| 2,757,510 | Holloway | Aug. 7, 1956 |
| 2,771,740 | Johnson | Nov. 27, 1956 |
| 2,778,190 | Bush | Jan. 22, 1957 |

FOREIGN PATENTS

| | | |
|---|---|---|
| 1,020,287 | France | Nov. 12, 1952 |
| 244,761 | Switzerland | June 2, 1947 |